United States Patent Office 3,809,748
Patented May 7, 1974

3,809,748
KALLIKREIN ISOLATION AND PURIFICATION
Boen Tie Khouw, Weston, Ontario, and Johan Peter Kesler, Rexdale, Ontario, Canada, assignors to Canada Packers Limited, Toronto, Ontario, Canada
No Drawing. Filed Mar. 6, 1972, Ser. No. 232,203
Int. Cl. A61k 17/00
U.S. Cl. 424—110
14 Claims

ABSTRACT OF THE DISCLOSURE

Comminuted hog pancreas is extracted with salt solution, a protein-precipitating salt is added to the extract in fractions to first precipitate protein impurities and to then precipitate crude kallikrein. The crude kallikrein is further purified by dialysis, and highly purified kallikrein is recovered from the resulting solution by adsorption on a strongly basic, synthetic, macroreticular, anion exchange resin.

---

This invention relates to the preparation of a purified form of kallikrein from naturally occurring source material. The product may be used in known manner in therapeutic compositions.

A typical source material of kallikrein is hog pancreas and, while the invention is not limited to the use of this source material, the representative procedure will be described with reference to this material. A number of kallikrein extraction procedures have been described in the prior art, including alkaline extraction followed by enzyme treatment, acidification, salting out and purification by dialysis (U.S. Pat. No. 2,424,401), thermolysis under acid conditions followed by separation of coagulated proteins from the aqueous phase (U.S. Pat. No. 2,784,142) and lengthy autolysis followed by filtration and purification (U.S. Pat. No. 2,219,167), but in most instances the kallikrein product is recovered in an impure and highly colored state.

Several basic ion exchangers, of the type derived from naturally occurring organic materials, have been used for the isolation and purification of kallikrein from its impure solutions. Thus, the use of certain cellulosic ion exchangers for purifying kallikrein is disclosed by U.S. Pat. No. 3,100,736. Derivatives of Sephadex, a hydrophilic, insoluble, molecular sieve, chromatographic medium made by cross-linking dextran has also been used. However, the use of these ion exchange materials is associated with many drawbacks, particularly when large scale preparation is involved. Cellulosic and dextran materials are fragile, are susceptible to microbial degradation and, like many anion exchangers, they are subject to considerable expansion and contraction of volumes with changes of ionic strength of the media. As a result the flow rate of these exchangers becomes too slow to be of practical value for large scale preparative methods. Further, the kallikrein recovered from these ion exchangers is often highly colored.

We have now discovered that these difficulties can be avoided through the use of strongly basic, synthetic, macroreticular, anion exchange resins. We found that a number of basic, synthetic ion exchange resins would adsorb kallikrein from its impure solutions. However, quite unexpectedly, we found that satisfactory desorption is obtainable only from the strongly basic, synthetic, macroreticular, anion exchange resins. Surprisingly, the more basic the macroreticular resin, the easier it becomes to desorb the kallikrein.

Briefly, this aspect of the invention comprises adsorbing the kallikrein from a solution of crude kallikrein, such as obtained by the extraction of swine pancreas, by any conventional adsorption technique, on a strongly basic, synthetic, macrorecticular, anion exchange resin, washing the resin to remove impurities, and then eluting the kallikrein from the resin with a salt solution having an ionic strength of at least 0.3. Up to 90%, or more, of the kallikrein present in the impure solution can be recovered in the eluate. Kallikrein can be precipitated from the eluate and recovered in the form of a white powder of high potency.

We have further discovered a simple extraction procedure, which, in combination with the improved purification procedure, provides a convenient, economical and rapid, overall industrial process for obtaining a high quality kallikrein product in good yield from the glandular starting material. Briefly, this extraction procedure comprises extraction of the comminuted, glandular source material with an aqueous salt solution, separation of the extract from residual tissue, adding a water soluble protein-precipitating salt to the extract in fractions to first precipitate protein impurities which are removed and to then precipitate crude kallikrein. The crude kallikrein is then dissolved in an aqueous solution and dialyzed. The dialyzed kallikrein-containing solution is then subjected to the aforementioned ion exchange resin treatment.

EXTRACTION

The salt used in the extraction of the glandular source material may be any of the common alkali metal and ammonium salts, such as sodium, potassium, or ammonium chlorides, nitrates, phosphates, etc. Common salt (NaCl) is quite satisfactory.

Aqueous salt solutions of a wide range of concentrations at any temperature below about 40° C. may be employed. A sodium chloride solution of from about 1 to 25% at ambient temperature or below is quite satisfactory.

The pH of the extracting solution should be above 4.0 and below 9.5 because the enzyme kallikrein is unstable outside this range. We have found it advantageous to conduct the extraction and subsequent precipitation steps at a pH in the range of 4 to 7 since trypsin and chymotrypsin precursors are not activated to their corresponding enzymes at this pH range and these substances may be recovered as by-products of the kallikrein process.

Kallikrein can be extracted in good yields in a short time from raw comminuted swine pancreas by extraction at ambient temperature with aqueous sodium chloride solution of about 2.5% concentration, at a pH in the range of 4 to 7, with recovery of other enzymes as by-products.

After separation of the extract from residual tissue, we find it convenient, where the extracting medium is below pH 5, to adjust the pH of the extract to about 5 to 7, at which pH the kallikrein is at its maximum stability. This may be accomplished by the addition of alkaline agents, such as ammonium hydroxide, sodium carbonate, potassium hydroxide or the like, to the extract. Where the pH of the extracting medium is above pH 7, adjustment to pH in the range of 5–7 can be accomplished by the addition of simple organic or inorganic acids, such as acetic acid, hydrochloric acid, and the like. However, this pH adjustment is not regarded as absolutely essential and, in general, the precipitation steps following extraction can be accomplished within the broad range of pH 5–9. As mentioned above, the pH range of 5–7 is preferred from the viewpoint of enzyme byproduct recovery.

The protein-precipitating salt to be added to the extract may be any of those known to accomplish this function. These include ammonium, sodium and magnesium sulfates and chlorides. Ammonium sulfate is usually the salt of choice. By adding such a salt to the extract in proper incremental amounts the concentration of the salt in solution can be increased to that amount at which a substantial amount of the non-kallikrein proteins, e.g., trypsin and chymotrypsin precursors, will precipitate and can be separated from the solution. Further addition of the salt will cause the crude kallikrein to precipitate. The exact concentration at which this will take place can be readily determined for each protein precipitating salt. With ammonium sulfate the bulk of the non-kallikrein proteins will precipitate from an aqueous, 2.5% sodium chloride, pancreatic extract at an ammonium sulfate saturation of approximately 0.4. Kallikrein will precipitate upon further addition of ammonium sulfate to provide a saturation of approximately 0.7.

Separation of the protein precipitate from the extract and the separation of the kallikrein upon the further salt addition can be accomplished by conventional filtration techniques. We do not find it necessary to add organic solvents, either water miscible or water-immiscible, at any stage of the separation and purification procedure. Moreover, thermolysis followed by recovery of an extract, a procedure extremely difficult to handle with large quantities of glandular materials, is avoided.

The crude kallikrein cake recovered after precipitation is dissolved in an aqueous solution, such as water or buffer solution, and further purified by dialysis against water or the buffer. At this point a further pH adjustment can be made on the dialyzed solution to that pH at which it is desired to conduct the final purification by adsorption of the kallikrein on the ion exchange resin. For example, the dialyzed solution may be brought to pH 8 by addition of ammonium hydroxide and the resulting solution filtered to provide a dark colored but clear solution for the adsorption procedure. Any of a number of buffers including formates, phosphates, carbonates, and the like may be used to buffer the solution at pH 8, which is about optimum for the subsequent adsorption on the selected resins. However, the solution may be buffered to any pH in the general range of about 5.5-8.5.

PURIFICATION

The resins used for the purification of the impure kallikrein obtained from the extraction procedure may be any of the strongly basic, synthetic, macroreticular, anion exchange resins that are commercially available.

The word "synthetic," as used herein, does not include ion exchange materials which have been derived from natural sources, such as from cellulose, dextran, and the like.

The word "Macroreticular," as used herein, is intended to apply to those resins which are differentiated from the conventional gel type resins by the possession of discrete pores of a relatively large size. Such resins are described in U.S. Pats. Nos. 3,037,052 and 3,454,493. In general, those macroreticular resins which have an average pore diameter in the range of about 300 to 500,000 angstoms are regarded as suitable for the present invention.

The strongly basic anion exchange resins having macroreticular structure may be of the styrene-divinyl benzene type having a quaternary ammonium, substituted amino, or other basic functionality. Macroreticular resins of this type are sold by Rohm and Haas under the trade names Amberlite IRA-900, Amberlite IRA-904, Amberlite IRA-910 and Amberlite IRA-938. Amberlite IRA-900 is said to have an average pore diameter of about 460 Angstroms, Amberlite IRA-904 is said to have an average pore diameter of form below 300 to about 1,900 Angstroms and Amberlite IRA-938 is said to have an average pore size of from about 25,000 to 230,000 Angstroms. Resins of this type may be made by the procedure disclosed in U.S. Pat. No. 3,454,493. However, for the purposes of this invention it does not matter how the resin is made provided it is of a strong, tough, synthetic polymer having a strongly basic functionality and a macroreticular structure. The resins are prepared for adsorption and are regenerated after adsorption and elution by known procedure as recommended by the manufacturer.

In order to illustrate the advantages of invention, a polymer having a strongly basic functionality and a macroreticular structure. The resins are prepared for ad- from a dilute aqueous solution and for the resulting adsorbates to release kallikrein upon elution. The results of such tests are presented in Table I, below:

TABLE I.—ADSORPTION AND DESORPTION OF KALLIKREIN ON ANION EXCHANGE MATERIALS

| Commercial name | Type | Absorption, percent units applied | Desorption, percent units eluted [1] |
|---|---|---|---|
| DEAE cellulose [2] | Strong base | 100 | ≥70 |
| Sephadex A-50 [2] | do | 100 | ~50 |
| Dowex 1-X1 | Strong base (gel type) | 100 | <40 |
| Dowex 2X8 | do | <10 | |
| IRA-400 | do | 20 | |
| IRA-401S | do | ~50 | ~10 |
| IRA-402 | do | <10 | |
| IRA-410 | do | <10 | |
| IRA-458 | do | ~30 | |
| Bio-Rex 5 | Intermediate base (gel type) | 10 | |
| Dowex WGR | Weak base (gel type) | <10 | |
| IR-45 | do | <10 | |
| IRA-47 | do | <10 | |
| IRA-68 | do | <10 | |
| IRA-900 | Strong base, macroreticular | 100 | 70 |
| IRA-904 | do | 100 | 60 |
| IRA-938 | do | 100 | >70 |
| IRA-93 | Weak base, macroreticular | 63 | 20 |
| Dowex FPS-4015L | do | 70 | 40 |
| Dowex FPS-4024L | do | 47 | 10 |

[1] Based on the initial applied units as 100%; elution being performed with 0.5 M NaCl.
[2] DEAE derivative of Sephadex.

It is apparent from Table I that not all anion exchange materials are capable of adsorbing kallikrein from dilute solutions and that, of those which do show good adsorption, only a few are capable of satisfactory elution. Of the strong base, intermediate base and weak base, gel type, anion exchangers only one, Dowex 1-X1 showed greater than 50% adsorption but with this material less than 40% could be desorbed. Satisfactory adsorption and desorption was obtainable with DEAE Cellulose and Sephadex A-50, but these materials are subject to disadvantages already noted.

Contrary to the results obtained with the gel type resins, it will be seen that the macroreticular type anion exchange resins of both the strong base and weak base types were good adsorbers for kallikrein. Indeed the stronger the basicity of these types of resins, the better their adsorption capability. Unexpectedly, the stronger the basicity and greater the adsorption capacity of these resins for kallikrein, the better was their ability to be desorbed. Moreover, the more strongly basic, macroreticular resins such as IRA-900, IRA-904 and IRA-938, are subject to less expansion and contraction of bed volumes with changes in ionic strength of the solutions than are the weakly basic resin types.

Adsorption of kallikrein on the strongly basic, synthetic, macroreticular, anion exchange resins may be conducted at any pH within the general range of pH 5-9, but extended treatment above about pH 8.5 is not recommended due to possible instability of the enzyme.

After adsorption, the resin should be washed with dilute electrolyte or buffer solution to remove extraneous impurities such as nonkallikrein proteins which may be present in the crude kallikrein solution. An electrolyte solution of ionic strength less than about 0.3 may be used for this purpose. Any of a number of electrolytes, such as the salts of sodium, potassium and ammonium may be used for this purpose, with sodium chloride buffered in the pH range of 6-8.5 being preferred.

For elution, an electrolyte solution of higher concentration is used. Suitably, this solution should have an ionic strength greater than 0.3 with better results being obtained with salt concentrations of greater than about 0.5 ionic strength. Any of a number of electrolytes, as described above, may be used for elution. A 0.5 to 1.5 molar solution of sodium chloride is satisfactory with a solution of about 1.0 molar NaCl being most practical. Higher concentrations may be used but appear to give no better result. The pH for elution may be in the range of about 5.5 to 8.5 with best results being obtained at higher pH values within this range. The salt solution may be buffered within this range by any suitable buffer, of which, ammonium formate is representative.

The solution of kallikrein obtained by elution of the resins of this invention, in contrast to the often dark colored solutions obtained by eluting the DEAE-cellulose type resins, is light colored and separation of kallikrein from this solution provides a white kallikrein powder of high potency. Color bodies adsorbed by the resin are removed in the regeneration stage rather than during elution.

The following example is representative of the overall extraction and purification procedure:

EXAMPLE (a) Extraction of kallikrein from hog pancreas

Minced hog pancreas (10 kg.) was stirred with 16 liters of 0.05 M sodium acetate buffer (pH 4.5) containing 0.5 M sodium chloride. This extraction was performed at 20° C. for 16 hours. The mixture was then passed through a screen, and the solids were extracted once more with buffer solution (8 liters). The two extracts were combined, acetic acid was added to adjust the solution to pH 4.5, and the solution was filtered. The filtrate was brought to pH 5.5 by adding 7 N ammonium hydroxide (70 ml.). A sample of this filtrate (18.1 liters) was analyzed in the presence of a trypsin inhibitor (tosyl-lysine chloromethyl ketone), and the extract was found to contain $6.5 \times 10^6$ BAEE units of kallikrein. Ammonium sulfate (240 g./l.) was added to bring the solution to 0.4 saturation, and the mixture was filtered to remove a considerable amount of extraneous proteins. Additional ammonium sulfate (200 g./l.) was added to the filtrate to bring it to 0.7 saturation. The resulting precipitate (260 g.), representing the crude kallikrein cake, was filtered off, dissolved in water (1.3 liters), and dialyzed against water. The dialyzed solution was treated with 7 N ammonium hydroxide to give pH 8, and it was then filtered. The clear, dark-colored, filtrate (1.8 liters) was found to contain $5.4 \times 10^6$ BAEE units of kallikrein.

(b) Purification of kallikrein on macroreticular resins (column technique)

Crude kallikrein cake prepared in a similar manner to that of (a) above (50 g. containing $2$–$2.5 \times 10^6$ BAEE units), was dissolved in 200 ml. of 0.2 M ammonium formate, pH 8.0, and dialyzed for 3–4 hours against the buffer. The dark-colored clear, dialyzed solution at pH 8.0 was then applied onto a column (5×35 cm.) of Amberlite IRA–938 equilibrated in the same formate solution at pH 8.0. The flow rate was adjusted to about 1.5 times the bed volume/hour. When all the sample solution had been adsorbed onto the resin bed, the resin-column was washed with 3–5 times the bed volumes of the initial formate solution to remove nonkallikrein proteins. The washed resin column was then eluted with 2 times the bed volumes of 1.0 M NaCl in 0.2 M ammonium formate, pH 8.0. The light colored eluate, containing about 80% of the initial applied kallikrein was then collected, and the kallikrein was further processed by the usual methods of salt precipitation to provide a white kallikrein powder. The used resin column was then regenerated with dilute HCl and conditioned for re-use.

(c) Purification of kallikrein on macroreticular resins (batch technique)

Alternatively, the adsorption of kallikrein was also performed in a batch-wise manner. In this case, the resin suspension was stirred for 3 hours in the dark-colored, clear dialyzed solution at pH 8.0, and the resin was then recovered by filtration. The resin was then washed in 0.2 M ammonium formate, pH 8.0 (3–5× resin volumes) by stirring the resin in the solution and recovering the resin by filtration. The washed resin was then stirred in the elution solution, 1 M NaCl in 0.2 ammonium formate, pH 8.0, in a total of 1–1.5× resin volumes. The eluate containing about 70% of the initial applied kallikrein was subsequently collected and the kallikrein was further processed in the usual manner.

A summary of the results of a number of purifications of crude kallikrein solutions under the general conditions of parts (b) and (c) of the foregoing example and with different representative strongly basic, synthetic, macroreticular, anion exchange resins is given in Table II below:

TABLE II.—SUMMARY OF PURIFICATION OF CRUDE KALLIKREIN ON MACRORETICULAR ANION EXCHANGE RESINS

| Resin | Fraction | BAEE/ mg. | Total BAEE units | Percent recovery |
|---|---|---|---|---|
| IRA–938 | Crude kallikrein solution | 140 | $1.9 \times 10^6$ | 90 |
| | Eluate | 1,050 | $1.7 \times 10^6$ | |
| | Crude kallikrein solution | 177 | $2.6 \times 10^6$ | 80 |
| | Eluate | 1,600 | $2.0 \times 10^6$ | |
| | Crude kallikrein solution | 177 | $2.6 \times 10^6$ | 90 |
| | Eluate | 1,027 | $2.3 \times 10^6$ | |
| | Crude kallikrein solution [1] | 173 | $2.7 \times 10^6$ | 74 |
| | Eluate | 1,042 | $2.0 \times 10^6$ | |
| IRA–900 | Crude kallikrein solution | 179 | $4.9 \times 10^5$ | 81 |
| | Eluate | 760 | $4.0 \times 10^5$ | |
| | Crude kallikrein solution | 200 | $2.2 \times 10^6$ | 86 |
| | Eluate | 780 | $1.9 \times 10^6$ | |
| IRA–910 | Crude kallikrein solution | 179 | $4.2 \times 10^5$ | 85 |
| | Eluate | 577 | $3.6 \times 10^5$ | |

[1] Adsorption and desorption were performed in a batch-wise manner.

A good recovery (80% or better) of kallikrein from solutions of the crude cake from the extraction process and a substantial purification factor (in the order of 10) were obtained in larger scale operations, using both column and batch techniques. Furthermore, the kallikrein eluted from the anion exchange resins contained no trypsin contamination, as measured by inhibitor assay system and electrophoresis. Indeed, further precipitation of the eluted kallikrein by means of salt and subsequent washing and drying the precipitate in salt-free condition yielded a white powder of kallikrein assaying at 2700–7000 BAEE units/mg. or 50–190 Frey units/mg.

We claim:

1. A process for obtaining kallikrein from kallikrein-containing animal glands, comprising extracting the glandular material with an aqueous salt solution at a pH greater than 4.0 and less than 9.5, adding a water-soluble protein-precipitating salt to said extract at a pH of about 5 to 7 in an amount sufficient to precipitate protein impurities while retaining substantially all of the kallikrein in solution, removing said precipitated impurities, adding a further amount of said salt to the solution to precipitate crude kallikrein, removing said precipitated crude kallikrein and dissolving it in an aqueous solution, dialyzing the resulting crude kallikrein solution, adsorbing the kallikrein from said solution at a pH of about 5 to 9.0 on a strongly basic, synthetic, macroreticular anion exchange resin having an average pore size in the range of from about 300 to 500,000 angstroms, washing the kallikrein-resin adsorbate to remove impurities and eluting the adsorbed kallikrein from said macroreticular resin with a salt solution having a pH of from about 5.5 to 8.5 and an ionic strength greater than about 0.3.

2. The process of claim 1 wherein the glandular material is comminuted swine pancreas, the comminuted pancreas is extracted with sodium chloride solution at a pH in the range of 4 to 5 and the pH of the extract is adjusted to a value in the range of 5 to 7 prior to addition of the precipitating salt.

3. The process of claim 2 wherein the extracting solution is buffered at about pH 4.5 and wherein the pH of the extract is adjusted to about 5.5 prior to adding the protein precipitating salt.

4. The processing of claim 1 wherein the extracting solution is a sodium chloride solution of about 2.5% concentration, the protein precipitating salt is ammonium sulfate, the non-kallikrein proteins are precipitated at an ammonium sulfate saturation of about 0.4 and the crude kallikrein is precipitated at an ammonium sulfate saturation of about 0.7.

5. The process of claim 1 wherein the pH of the dialyzed kallikrein solution is adjusted to a pH in the range of 5.5 to 8.5 and the solution is filtered prior to adsorption of kallikrein on said resin.

6. The process of claim 1 wherein the non-kallikrein proteins are washed from the kallikrein-resin adsorbate with a salt solution of ionic strength below 0.3 buffered at a pH of about 8.0.

7. The process of claim 1 wherein the salt solution for eluting said resin is a 0.5 to 1.5 molar solution of NaCl.

8. A process for obtaining kallikrein from swine pancreas, comprising extracting the comminuted glands with sodium chloride solution buffered at about pH, 4.5, adjusting the pH of the extract to about 5.5, adding ammonium sulfate to precipitate a non-kallikrein protein fraction, separating the precipitated protein fraction, adding ammonium sulfate to the resulting solution to raise the concentration and to precipitate crude kallikrein, dissolving said crude kallikrein in an aqueous solution, dialyzing the resulting kallikrein solution, adjusting the pH of dialyzed solution to about pH 8, adsorbing the kallikrein from said solution on a strongly basic, synthetic, macroreticular, anion exchange resin having an average pore diameter in the range of about 300 to 500,000 angstroms, washing non-kallikrein proteins from the kallikrein-resin adsorbate with a salt solution buffered at about pH 8.0 and having an ionic strength below 0.3, eluting the adsorbed kallikrein from said resin with salt solution having a concentration of about 0.5 to 1.5 M NaCl buffered at about pH 8.0, and recovering the kallikrein from said eluate.

9. A process for obtaining purified kallikrein from a solution of kallikrein containing impurities, comprising adsorbing kallikrein from such solution at a pH of from about 5.0 to 9.0 on a strongly basic, synthetic macroreticular, anion exchange resin having an average pore size in the range of from about 300 to 500,00 angstroms, washing the kallikrein-resin adsorbate with an electrolyte solution having an ionic strength below 0.3, eluting the kallikrein from the washed resin-adsorbate with an electrolyte solution having a pH of from about 5.5 to 8.5 and an ionic strength of at least 0.3 and recovering the kallikrein from the eluate.

10. The process of claim 9 wherein the macroreticular anion exchange resin has an average pore size in the range of from 300 to 230,000 angstroms.

11. The process of claim 9 wherein the electrolyte solution used to elute kallikrein from the resin is a 0.5 to 1.5 molar sodium chloride solution.

12. The process of claim 9 wherein the electrolyte solution is buffered at about pH 8.

13. A process for obtaining purified kallikrein from a solution of kallikrein containing impurities, comprising adsorbing kallikrein from such solution at pH of about 5.0 to 9.0 on a strongly basic, synthetic, macroreticular, anion exchange resin having an average pore size in the range of about 300 to 500,000 angstroms, washing the resulting resin adsorbate to remove impurities, eluting the kallikrein from said resin with a soduim chloride solution containing about 0.5 to 1.5 moles of sodium chloride per liter buffered at about pH 8, and recovering the kallikrein from the eluate.

14. A composition comprising kallikrein adsorbed on a strongly basic, synthetic, macroreticular, anion exchange resin having an average pore diameter in the range of about 300 to 230,000 angstroms.

References Cited
UNITED STATES PATENTS
3,100,736   8/1963   Werle et al. _____ 424—110

SAM ROSEN, Primary Examiner

U.S. Cl. X.R.
424—95

UNITED STATES PATENT OFFICE
CERTIFICATE OF CORRECTION

Patent No. 3,809,748      Dated May 7, 1974

Inventor(s) BOEN TIE KHOUW and JOHAN PETER KESLER

It is certified that error appears in the above-identified patent and that said Letters Patent are hereby corrected as shown below:

IN THE SPECIFICATION:

Column 4, lines 2 and 3 "polymer having a strongly basic functionality and a macroreticular structure. The resins are prepared for ad-" should be deleted and replaced with --number of commercially available, anion exchange materials were tested for their ability to adsorb kallikrein---

Signed and sealed this 17th day of September 1974.

(SEAL)
Attest:

McCOY M. GIBSON JR.
Attesting Officer

C. MARSHALL DANN
Commissioner of Patents